(12) United States Patent
Bell (10) Patent No.: US 9,309,995 B2
(45) Date of Patent: Apr. 12, 2016

(54) LOW PROFILE DOWNSPOUT EXTENSION WITH NON-RECTANGULAR OUTLET

(71) Applicant: Euramax International, Inc., Norcross, GA (US)

(72) Inventor: Robert Benjamin Bell, Douglasville, GA (US)

(73) Assignee: Euramax International, Inc., Norcross, GA (US)

( * ) Notice: Subject to any disclaimer, the term of this patent is extended or adjusted under 35 U.S.C. 154(b) by 0 days.

(21) Appl. No.: 14/079,888

(22) Filed: Nov. 14, 2013

(65) Prior Publication Data

US 2014/0069544 A1 Mar. 13, 2014

Related U.S. Application Data

(63) Continuation of application No. 13/739,697, filed on Jan. 11, 2013, now Pat. No. 8,607,827, which is a continuation-in-part of application No. 12/952,078, filed on Nov. 22, 2010, now Pat. No. 8,602,066.

(51) Int. Cl.
*F16L 11/11* (2006.01)
*F16L 9/00* (2006.01)
*E04D 13/08* (2006.01)

(52) U.S. Cl.
CPC ............... *F16L 9/006* (2013.01); *E04D 13/08* (2013.01); *E04D 2013/0813* (2013.01)

(58) Field of Classification Search
CPC .. F16L 9/006; E04D 13/08; E04D 2013/0813
USPC .................. 138/118, 109, 121; 405/118, 119; 52/11, 16; 239/508
See application file for complete search history.

(56) References Cited

U.S. PATENT DOCUMENTS 1,242,871 A 6/1881 Bradish
2,455,910 A 7/1891 Gordon
(Continued)

FOREIGN PATENT DOCUMENTS

FR 1588077 4/1970
FR 2333578 7/1977
(Continued)

OTHER PUBLICATIONS

U.S. Appl. No. 13/739,697, "Non-Final Office Action", Jul. 31, 2013, 6 pages.
(Continued)

*Primary Examiner* — Patrick F Brinson
(74) *Attorney, Agent, or Firm* — Kilpatrick Townsend & Stockton, LLP (57) ABSTRACT

A low profile downspout extension is formed in multiple segments including a flexible conduit, a splash block and an extension. The splash block transitions from a circular inlet into a low profile pentagon configuration with a central bead along the top surface of the low profile body portion to define an apex of the pentagon shape. The body portion is wider than the diameter of the circular inlet but has a height at the central bead that is more than half the diameter of the circular inlet. The body portion has ribbed side walls to strengthen the splash block without requiring internal reinforcement. The bottom surface of the splash block defines a flow path that extends generally linearly from the bottom of the inlet opening to the bottom of the pentagon-shaped outlet. An open configuration for the splash block provides an alternative above-ground splash pad structure.

21 Claims, 7 Drawing Sheets

(56) References Cited

U.S. PATENT DOCUMENTS

| | | |
|---|---|---|
| 577,362 A | 2/1897 | Ettlinger |
| 749,232 A | 1/1904 | Shaw |
| 873,301 A | 12/1907 | Cummings et al. |
| 1,033,195 A | 7/1912 | Robinson |
| 1,239,373 A | 9/1917 | Farmer et al. |
| 1,273,200 A | 7/1918 | Symonds |
| 1,376,134 A | 4/1921 | Bearden |
| 1,438,933 A | 12/1922 | Bungay |
| D96,152 S | 7/1935 | Zinkil |
| 2,116,863 A | 5/1938 | Dinley |
| 2,397,655 A | 4/1946 | Francis |
| 2,586,145 A | 2/1952 | Breuer et al. |
| 2,655,408 A | 10/1953 | Williams |
| 2,661,225 A | 12/1953 | Lyon |
| 2,814,529 A | 11/1957 | Arnt |
| 2,868,228 A | 1/1959 | Russell |
| 2,898,939 A | 8/1959 | Fox |
| 3,374,955 A | 3/1968 | Hester |
| 3,429,125 A | 2/1969 | Shotton |
| 3,861,419 A | 1/1975 | Johnson |
| 3,911,954 A | 10/1975 | Johnson |
| 4,112,568 A | 9/1978 | Hale |
| 4,247,136 A | 1/1981 | Fouss et al. |
| 4,273,367 A | 6/1981 | Keeney et al. |
| 4,345,853 A | 8/1982 | Fisher |
| 4,480,855 A | 11/1984 | Rosenbaum |
| 4,575,133 A | 3/1986 | Nattel |
| 4,688,720 A | 8/1987 | MacDonald et al. |
| 4,982,653 A | 1/1991 | Gordon et al. |
| 5,031,426 A | 7/1991 | Wilson |
| 5,150,930 A | 9/1992 | Petty et al. |
| 5,332,270 A | 7/1994 | Petty et al. |
| D350,722 S | 9/1994 | Figueroa |
| 5,358,007 A | 10/1994 | Carlberg |
| 5,375,891 A | 12/1994 | Sicotte et al. |
| 5,387,016 A | 2/1995 | Joseph et al. |
| D357,774 S | 4/1995 | Kishi |
| 5,494,828 A | 2/1996 | Leopando |
| 5,511,829 A | 4/1996 | Sicotte et al. |
| D377,248 S | 1/1997 | Kishi |
| D382,683 S | 8/1997 | Henke et al. |
| 5,652,995 A | 8/1997 | Henke et al. |
| 5,658,092 A | 8/1997 | Sweers |
| 5,673,519 A | 10/1997 | McCaughan |
| 5,735,085 A | 4/1998 | Denooy |
| 5,813,701 A | 9/1998 | Noble |
| 5,823,580 A | 10/1998 | Ungerecht |
| 5,862,632 A | 1/1999 | Zima |
| 5,915,735 A | 6/1999 | Noble |
| 6,007,110 A | 12/1999 | Amatsutsu |
| 6,041,825 A | 3/2000 | Noble |
| 6,202,358 B1 | 3/2001 | Janesky |
| 6,223,777 B1 | 5/2001 | Smith et al. |
| 6,240,680 B1 | 6/2001 | Estes |
| 6,520,702 B2 | 2/2003 | Heusser |
| 6,612,075 B1 | 9/2003 | Knoop et al. |
| 6,726,130 B2 | 4/2004 | Jaubertie |
| 6,843,274 B1 | 1/2005 | Angelico |
| 6,969,015 B1 | 11/2005 | Salmela |
| D514,670 S | 2/2006 | Handley |
| 7,017,614 B2 | 3/2006 | Handley |
| 7,017,949 B2 | 3/2006 | Luft et al. |
| D533,322 S | 12/2006 | Blateri |
| 7,458,532 B2 | 12/2008 | Sloan |
| 7,669,780 B2 | 3/2010 | Sugano et al. |
| 7,677,271 B2 | 3/2010 | Boettner et al. |
| 7,748,650 B1 | 7/2010 | Sloan |
| 8,251,302 B2 | 8/2012 | Sloan |
| 8,322,083 B1 | 12/2012 | Kessler |
| 8,475,654 B1 | 7/2013 | Smith |
| 8,556,195 B1 | 10/2013 | Sloan |
| 2002/0095876 A1 | 7/2002 | Frey |
| 2005/0160681 A1 | 7/2005 | Boelling |
| 2007/0046021 A1 | 3/2007 | Crawford |
| 2007/0246579 A1 | 10/2007 | Blateri |
| 2008/0023959 A1 | 1/2008 | Crawford |

FOREIGN PATENT DOCUMENTS

| | | |
|---|---|---|
| FR | 2813211 | 3/2002 |
| GB | 1490377 | 11/1977 |
| JP | D457268 | 9/1952 |
| JP | S52-067615 | 5/1977 |
| JP | S54-058629 | 4/1979 |
| JP | S56-039542 | 4/1981 |
| JP | D1155936 | 10/2002 |
| JP | 2004105312 | 4/2004 |
| JP | D1209563 | 6/2004 |
| SU | 1171097 | 8/1985 |

OTHER PUBLICATIONS

U.S. Appl. No. 13/739,697, "Notice of Allowance", Sep. 3, 2013, 6 pages.
Downspout Installation, Popular Mechanics, Mar. 1987, 1 page.
Handbook of Steel Drainage & Highway Construction Projects, American Iron and Steel Institute, 1994, 5 pages.
Safety Advances in Culvert Technology, Ontario Transp. Tech. Transfer Digest, vol. 5, No. 1, 1999, 8 pages.
Stormwater Management Manual for Western Washington, vol. V, Runoff Treatment BMPs, prepared by Washington State Department of Ecology, Publication No. 05-10-33, Feb. 2005, 250 pages.
Abt et al., Influence of Culvert Shape on Outlet Scour, Journal of Hydraulic Engineering, vol. 113, No. 3, Mar. 1987, pp. 393-400.
Advanced Drainage Systems Inc., drawing from fittings manual, dated Apr. 6, 2006, 1 page.
Armco Inc., Handbook Of Drainage And Construction Products, Armco Drainage & Metal Products, Inc., 1958, 3 pages.
Armtec, drawing, Safety Slope End Section for Round & Arched Pipes, (Jul. 2000).
Burgess, Real Estate Home Inspection: Mastering the Profession, 5th edition, 2002, 3 pages.
California Department of Transportation, Metal and Plastic Flared End Sections drawings, Jul. 1, 1992, 2 pages.
Charbeneau et al., Evaluation Of Hydraulic Effects Of Culvert Safety End Treatments, CTR Technical Report, UTexas, Oct. 2004, 67 pages.
Eisinger et al., Automatic Shape Optimisation Of Hydro Turbine Components Based On CFD, Task Quarterly, vol. 6, No. 1, 2002, pp. 101-111.
Federal Highway Administration, Hydraulic Design of Energy Dissipators for Culverts and Channels, Hydraulic Engineering Circular No. 14, Sep. 1983, 330 pages.
Fla. DOT, Design Standards, 2012/2013, 9 pages.
Henkenius, Gutter Maintenance, Popular Mechanics, Apr. 1992, 3 pages.
Mendoza et al., Headwall Influence On Scour At Culvert Outlets, J. Hydraul. Eng., vol. 109, No. 7, Jul. 1983, pp. 1056-1060.
National Highway Institute, Hydraulic Design of Energy Dissipators for Culverts and Channels, Jul. 2006, 287 pages.
National Highway Institute, Hydraulic Design of Highway Culverts, Sep. 2001, 8 pages.
Ross et al., Safety Treatment of Roadside Parallel-Drainage Structures, Tex. Transp. Institute, Jun. 1981, 184 pages.
West Virginia Department of Transportation, Standard Details Book, vol. 1, Drainage, Guardrail, Pavement Fence, and Markers, Jan. 1, 2000, 64 pages.

LOW PROFILE DOWNSPOUT EXTENSION WITH NON-RECTANGULAR OUTLET

CROSS-REFERENCE TO RELATED APPLICATIONS

This application is a continuation of U.S. patent application Ser. No. 13/739,697, filed on Jan. 11, 2013, which is a continuation-in-part of co-pending U.S. patent application Ser. No. 12/952,078, filed on Nov. 22, 2010, the contents of both of which are incorporated herein by reference.

FIELD OF THE INVENTION

This invention relates generally to an apparatus for conveying rainwater away from a downspout and, more particularly, to a downspout extension that connects to different downspout sizes and incorporates a low profile configuration to move water underneath landscaping to a remote discharge location.

BACKGROUND OF THE INVENTION

Gutters and downspouts are mounted on most residential and commercial structures along the lower edge of the roof of the structure to receive water draining off of the roof, such as during a rainstorm. Gutters come in many different styles, including K gutter, half round gutter, or commercial box gutter, but all are generally formed with an open top through which water is received into a trough or channel that delivers the water by gravity to a downspout for discharge away from the building structure. Gutters are often mounted on a plurality of hangers that are spaced along the length of the gutter and fastened to fascia boards by nails or screws such that the gutter is suspended from the hangers. The downspout is connected to an outlet of the gutter to provide a conduit to drain the collected rainwater from the gutter for discharge along the surface of the ground and direct the rainwater away from the building structure.

Typically, the downspout is provided with an elbow at the discharge end thereof to direct the discharged rainwater into a generally horizontal direction away from the building on which the downspout is mounted. These elbows at the discharge end of the downspout have a short length and are only effective to provide a direction for the discharge of the rainwater away from the building; therefore, the rainwater is often discharged too close to the building and the discharged rainwater can find a way into the basement of the building to cause cracks or leaks. Splash blocks can be provided to receive the discharged rainwater from the downspout elbow and help direct the rainwater away from the building. Other attempts to divert the rainwater from downspouts include a non-flexible extension, which is typically a generally horizontally disposed piece of downspout affixed to the discharge end of the elbow, and a flexible downspout extension that can be bent in a desired direction to redirect the discharged rainwater.

Occasionally, a landowner will bury into the ground a drainage pipe or conduit for conveying rainwater to a remote location, such as a groundwater restoration cistern, or at least some point remotely distant from the building. The downspout is then connected to the drainage pipe by the downspout extension so that the rainwater is discharged at a location that will not infiltrate into the basement of the building. Once such downspout extension can be found in U.S. Pat. No. 5,813,701, granted to Christopher Noble on Sep. 29, 1998. The Noble downspout extension is formed with multiple adapter portions at each end of a flexible central portion. The adapter segments at the respective ends of the downspout extension are separated by a cut line to allow the installer of the downspout extension to separate the outwardmost adapter segment from the downspout extension so that the inner adapter segment could be utilized to connect to the downspout. The Noble downspout extension is formed so that the adapter segments at one end of the downspout extension will be capable of fitting into the corresponding adapter segment at the opposing end of the downspout extension so that multiple downspout extensions can be hooked together in a serial manner.

In U.S. Pat. No. 6,041,825, granted to Christopher Noble on Mar. 28, 2000, the downspout extension was formed with multiple adapter segments at each end of the flexible central portion of the downspout extension. More particularly, the adapter segments begin with a large rectangular configuration on the outwardmost ends of the downspout extension followed inwardly by a smaller rectangular adapter segment and then inwardly a smaller circular adapter segment. Each adapter segment is separable from the inwardly disposed adapter segment by a cut line so that the outward adapter segments can be removed. Accordingly, when the outwardmost adapter segment was utilized to connect to the discharge end of the downspout, the rainwater, and any debris entrained within the flow of the rainwater had to pass from a larger adapter configuration into a smaller adapter configuration, thus forming a restriction on the flow through the downspout extension.

A differently configured flexible downspout extension is disclosed in U.S. Pat. No. 7,017,614 granted on Mar. 28, 2006, to Stephen Handley. In the Handley downspout extension, one end of the downspout extension was formed with multiple rectangular adapter segments arranged in decreasing sizes from the outwardmost adapter segment to the innermost adapter segment, while the opposing end of the downspout extension was provided with circular connector sized for attachment to a circular drainage pipe or conduit. Thus, one end of the flexible downspout extension is formed for connection to a downspout, while the opposing end is formed for connection to a drainage pipe. As with the Noble downspout extensions, the connection of the downspout to the outwardmost adapter segment causes the flow to be constricted through decreasingly smaller adapter segments before reaching the central flexible portion.

Low profile downspout extensions are known from U.S. Pat. No. 5,862,632, granted to Eric M. Zima on Jan. 26, 1999, in which a telescopic extension is coupled to the discharge end of the downspout to direct water therefrom to a remote location. The rain chute disclosed in U.S. Pat. No. 6,202,358, issued on Mar. 20, 2001, to Lawrence M. Janesky, also provides a low profile apparatus for conveying water to a remote location from the downspout of a building. A low profile conduit connectable to a downspout discharge is disclosed in U.S. Pat. No. 7,458,532, granted on Dec. 2, 2008, to W. Haynes Sloan. The structure of this low profile conduit requires a reinforcement member at the transition area between the circular connector and the low profile rectangular conduit.

It would be desirable to provide a low profile downspout extension that is configured to connect to either 2×3 or 3×4 rectangular downspouts and transition into a low profile rectangular conduit that can be located below landscaping without providing internal reinforcement members. It would further be desirable to provide a low profile downspout extension that is extendable incrementally to provide a conduit of desirable length.

SUMMARY OF THE INVENTION

It is an object of this invention to overcome the disadvantages of the prior art by providing a low profile downspout extension that is connectable to different downspout sizes and transitions into a low profile conduit.

It is another object of this invention to provide a low profile downspout extension that multiple component parts that couple together to convey rainwater from a downspout to a remote location.

It is a feature of this invention that the low profile portions of the downspout extension is formed with vertically oriented side ribs to provide strength to the low profile portions.

It is another feature of this invention that the low profile connector segments are formed in a non-rectangular configuration to cooperate with the ribbed side walls to strengthen the connector segments.

It is still another feature of this invention that the top surface of the low profile connector segments are formed with a central bead to strengthen the cross-sectional configuration of the low profile connector segments.

It is yet another feature of this invention that the low profile portions of the extension member have a cross-section configuration in the shape of a pentagon with the central bead in the top surface forming an apex of the pentagon shape.

It is an advantage of this invention that the ribbed side walls of the low profile connector segments provide a capability of telescoping an extension segment from the splash block segment.

It is another advantage of this invention that the length of the low profile conduit can be extended by adding additional segments.

It is still another feature of this invention that the splash block of the extension member has a substantially linear flow path from the inlet opening to the outlet opening.

It is another advantage of this invention that water will not be trapped in the splash block.

It is still another feature of this invention that the extension member can be connected to a downspout by an adapter.

It is a further feature of this invention that the adapter can be connected to a flexible conduit component.

It is still another object of this invention to provide a low profile downspout extension that can be utilized above ground on top of landscaping.

It is still a further feature of this invention that the body portion of the splash block member is formed in an open configuration to expose the bottom surface of the body portion to the atmosphere.

It is still another advantage of this invention to provide an open splash block configuration for an aesthetically desirable alternative to the closed body member configuration.

It is yet another advantage of this invention that the open splash pad configuration for the body portion has a tapered sidewall having the smallest height at the discharge end of the splash pad.

It is yet another object of this invention to provide a low profile downspout extension that is connectable to the discharge end of a downspout to direct rainwater away from the building on which the downspout is mounted, which is durable in construction, inexpensive of manufacture, carefree of maintenance, facile in assemblage, and simple and effective in use.

These and other objects, features and advantages are accomplished according to the instant invention by providing a low profile downspout extension that can be formed in multiple segments including a flexible conduit component, a splash block component and an extension component. The splash block component transitions from a circular inlet into a low profile pentagon configuration in the body portion with a central bead along the top surface of the low profile body portion to define an apex of the pentagon shape. The body portion is wider than the diameter of the circular inlet but has a height at the central bead that is more than half the diameter of the circular inlet. The body portion is also formed with ribbed side walls to enhance the strength of the body portion without requiring internal reinforcement. The bottom surface of the splash block component defines a flow path that extends generally linearly from the bottom of the circular inlet opening to the bottom of the pentagon-shaped outlet opening. An open configuration for the splash block component provides an alternative above ground splash pad structure for connecting to downspouts.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
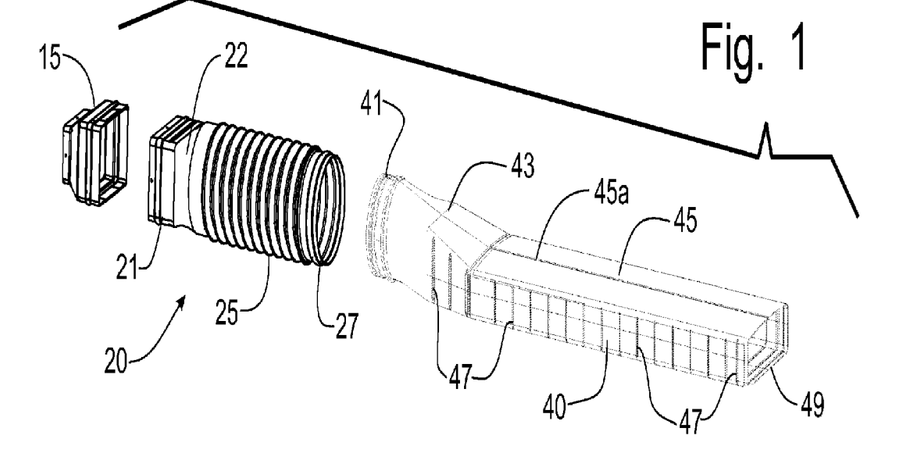
FIG. 1 is an exploded perspective view of the primary components of the low profile downspout extension with the flexible conduit component being oriented in a first configuration.
Figure 2:
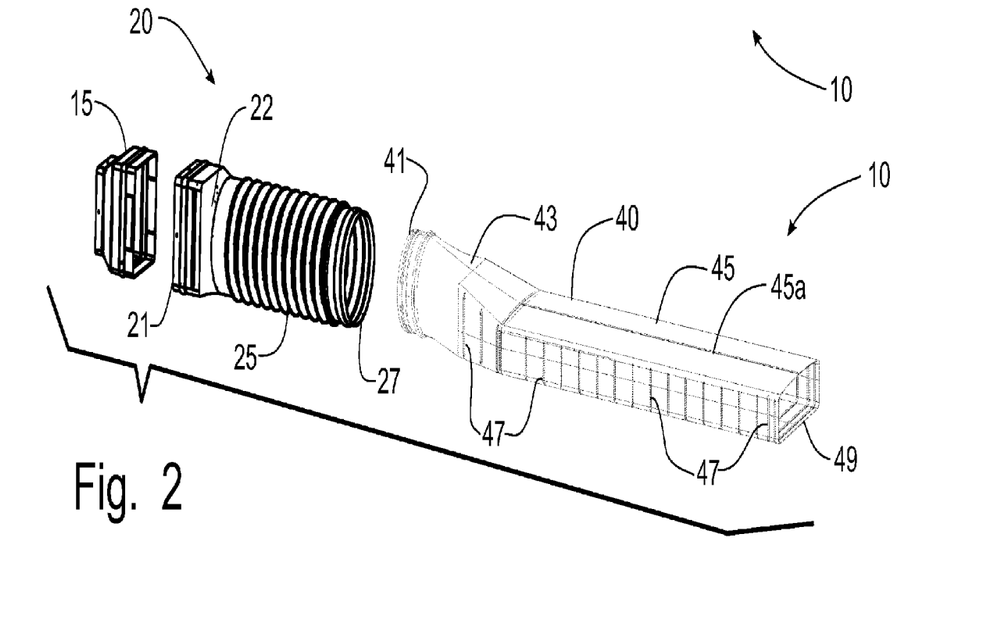
FIG. 2 is an exploded perspective view of the primary components of the low profile downspout extension with the flexible conduit component being oriented in a second configuration.
Figure 3:
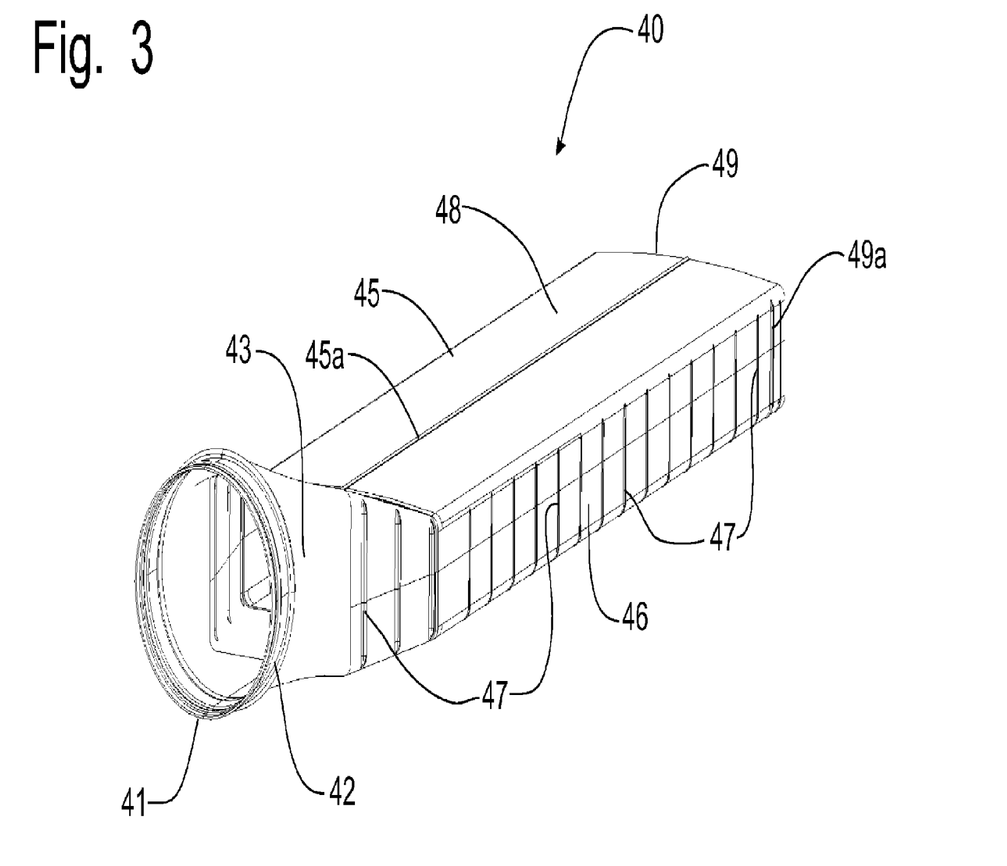
FIG. 3 is a perspective view of the splash block component looking into the circular inlet end thereof.
Figure 4:
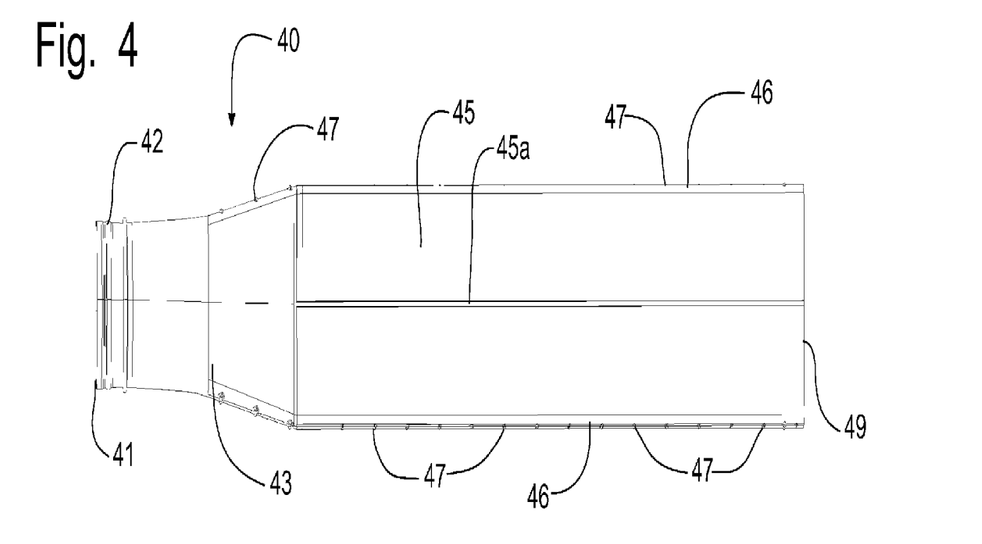
FIG. 4 is a top plan view of the splash block component shown in FIG. 3.

Referring now to the drawings, a low profile downspout extension incorporating the principles of the instant invention can best be seen. The low profile downspout extension is described in greater detail in co-pending U.S. patent application Ser. No. 12/952,078 of Robert Benjamin Bell, et al, filed on Sep. 27, 2010, the content of which is incorporated herein in its entirety. The low profile downspout extension 10 is preferably formed from a hydrocarbon polymer, such as vinyl, polypropylene, PET and PVC, and includes separate components that can be assembled into a downspout extension of variable length depending on the utilization of extension components. As best seen in FIGS. 1 and 2, the downspout extension 10 includes a flexible conduit component 20, an adapter 15 detachably connectable to the inlet end 21 of the flexible conduit component 20 to selectively change the size of the connection to the downspout (not shown), a fixed length splash block component 40 and one or more extension components that can be connected to extend the length of the downspout extension as far as desired.

The flexible conduit component 20 is formed with a rectangular inlet end 21, a circular outlet end 27 and a corrugated flexible portion 25 interconnecting the inlet and outlet ends 21, 27. The rectangular inlet end 21 is preferably sized to mount onto a three inch by four inch rectangular downspout outlet (not shown) and is provided with screw dimples or holes to facilitate the utilization of screws to secure the inlet end 21 to the downspout. The flexible conduit component 20 also includes a transition portion 22 that converts the shape from rectangular to circular that mates with the central corrugated flexible portion 25, which is approximately four inches in diameter. The central flexible portion 25 is bendable in substantially any direction to allow the inlet end 21 to be oriented relative to the outlet end 27 as desired. The central flexible portion 25 terminates in the circular outlet end 27 that is formed with a connecting rib projecting in a raised manner outwardly from the exterior surface of the outlet end 27.

The inlet end 21 of the flexible conduit component 20 is also formed with a connecting rib that extends around the perimeter of inlet end 21 and with an attachment rib that is formed on the top and bottom surfaces of the inlet end 21. The flexibility of the corrugated central portion 25 allows the inlet end 21 to be oriented generally vertically for connection to a discharge end of a downspout (not shown) while the outlet end 27 is typically oriented generally horizontally to connect to the splash block component 40 that is positioned to divert water from the downspout underneath landscaping or other cover (not shown). One skilled in the art will readily understand that other selective configurations can be achieved with the ability to position the inlet end 21 as desired relative to the outlet end 27.

The adapter 15 is formed with a rectangular inlet end and a rectangular outlet end. The inlet end is preferably sized to fit over a two inch by three inch downspout discharge end. As with the inlet end 21 of the flexible conduit component 20, screw dimples or holes are formed in each side of the perimeter of the inlet end to allow the use of screws to fasten the adapter to the downspout (not shown). The outlet end is sized to fit internally of the inlet end 21 of the flexible conduit component 20 and, thus, is substantially at a three inch by four inch rectangular size. The adapter 15 has a transition portion that expands the shape of the adapter 15 from the smaller inlet end to the larger outlet end.

The outlet end is also provided with a connecting rib extending around the perimeter of the outlet end and positioned to engage within the connecting rib of the flexible conduit component when the outlet end is positioned within the inlet end 21 of the flexible conduit component 20 to help retain the adapter within the flexible conduit component 20. The top and bottom surfaces of the outlet end of the adapter 15 are also provided with a deflecting attachment tab having a ridge at the distal end thereof. The attachment tab is operable to deflect inwardly because the ridge pushes the attachment tab inwardly as the adapter 15 is inserted into the inlet end 21 of the flexible conduit component 20. When the ridge is aligned with the attachment rib the attachment tab springs outwardly to lock the ridge into the attachment rib, locking the adapter 15 into the flexible conduit component 20.

The splash block component 40 includes an inlet end 41 formed in a circular configuration to mate with the outlet end 27 of the flexible conduit component 20. As with the adapter 15, the inlet end 41 is sized to receive the outlet end 27 of the flexible conduit component 20 and is formed with a connecting rib 42 that will be engaged by the connecting rib of the outlet end 27 of the flexible conduit component 20 when inserted into the inlet end 41. The splash block component 40 has a body portion 45 that is non-rectangular in shape but has a low profile that has the height at slightly more than half of the diameter of the circular inlet end 41 and is much smaller than the width. The body portion 45 terminates in an outlet end 49 that includes a connecting rib 49a projecting outwardly thereof around the perimeter of the low profile outlet end 49. Between the circular inlet end 41 and the body portion 45, a transition portion 43 changes the circular shape of the inlet end 41 to the low profile non-rectangular body portion 45.

Figure 8:
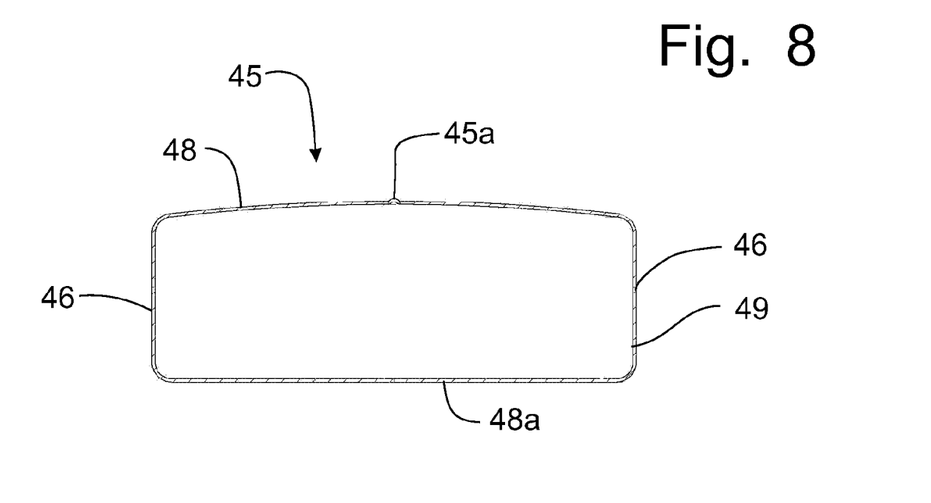
FIG. 8 is an enlarged cross-sectional view of the low profile portion taken along lines 8-8 of FIG. 4 to show the pentagon shape of the low profile portion.
Figure 9:
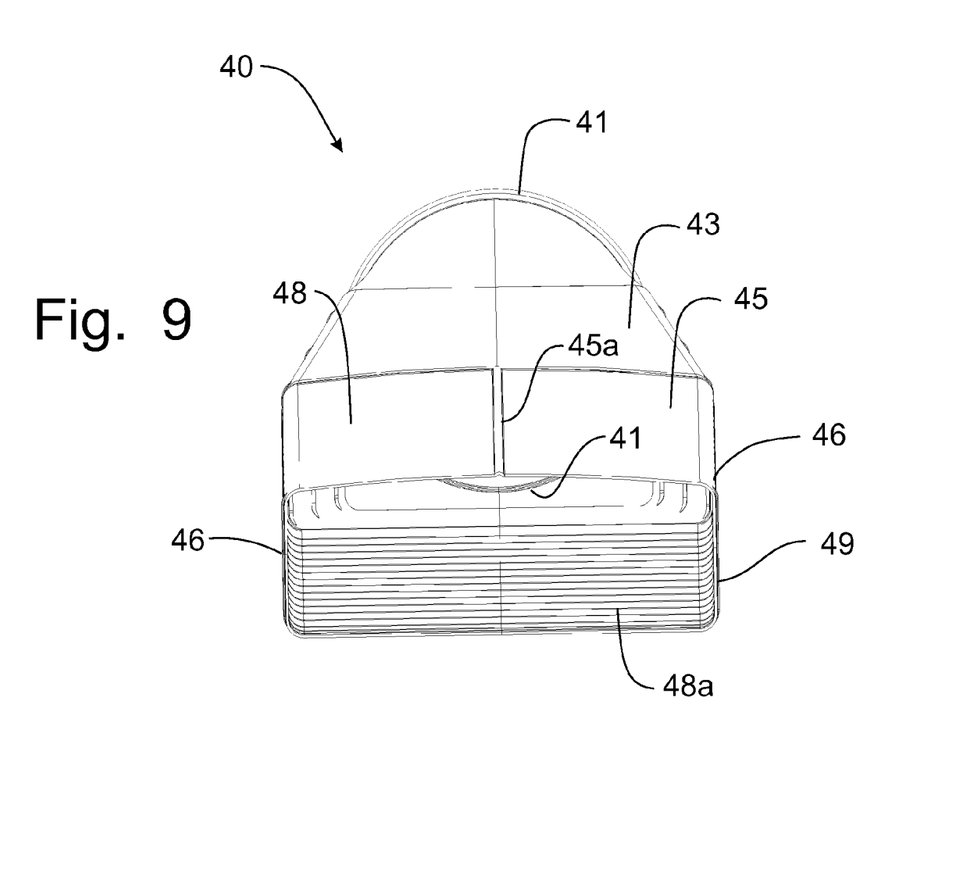
FIG. 9 is a perspective view from the outlet end of the splash block component.

The body portion 45 is preferably formed in the cross-sectional shape of a pentagon with the uppermost apex thereof being located at the center of the top surface 48 of the body portion 45. The other four apexes of the pentagon shape are located at the top and bottom corners of the side walls 46, although each side wall apex is rounded to enhance the strength of the body portion 45. The side walls 46 are formed along the longitudinal length of the body portion 45 with a series of spaced apart reinforcing ribs 47 that provide structural strength to the body portion 45 and resist collapse thereof when weight is placed on the top surface 48 between the side walls 46. To further strengthen the cross-section of the body portion 45, the apex 52 at the center of the top surface 48 is formed with a rounded bead 45a.

One skilled in the art will recognize that other geometric shapes can be utilized to strengthen the cross-sectional shape of the body portion 45 so as to eliminate the need for internal reinforcements within the body portion 45. One such shape could be a triangular configuration with the upper apex thereof aligned with the central bead 45a in the top surface 48. A further configuration to enhance the strength of the body portion 45 as compared to a simple rectangular shape would be a crowned or arched top surface 48 to bows upwardly relative to the bottom surface 48a to distribute the weight asserted on the top surface 48 outwardly to the side walls 46. The top surface 48, or at least a portion thereof, can also be formed with reinforcing ribs that cross laterally from one side wall 46 to the other.

Figure 5:
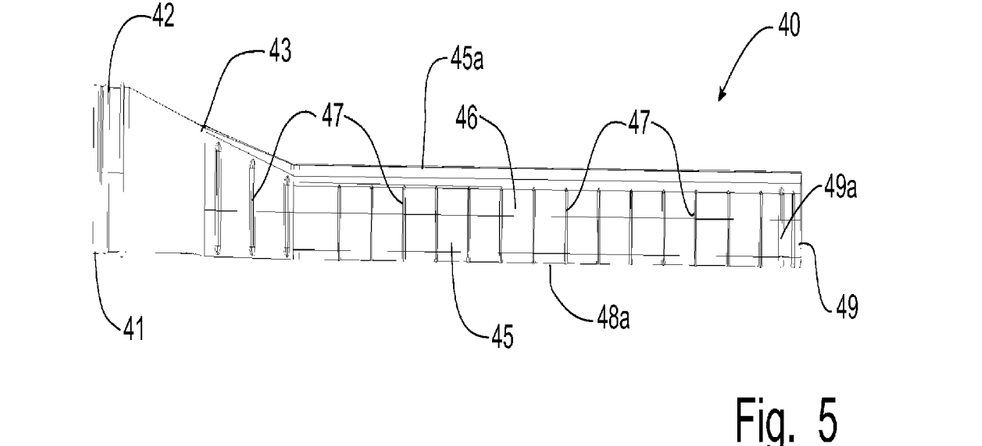
FIG. 5 is a side elevational view of the splash block component shown in FIG. 3.
Figure 6:
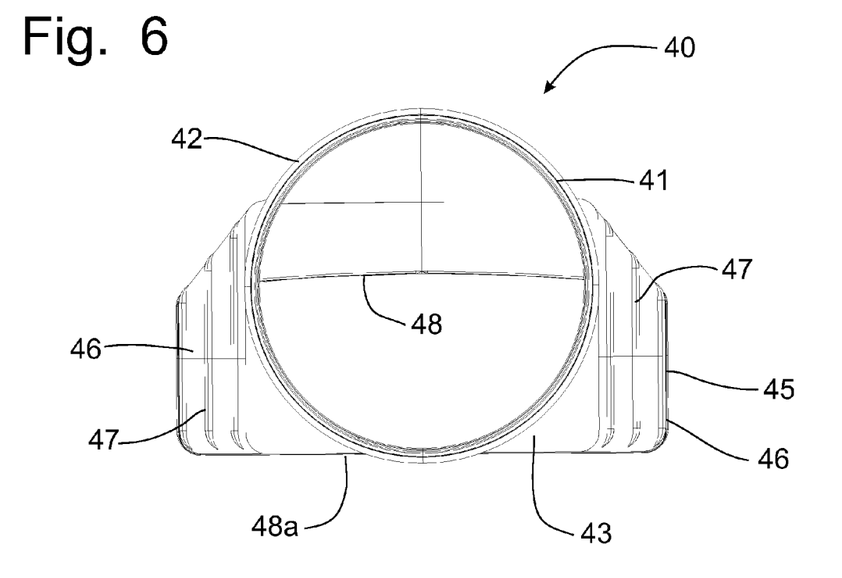
FIG. 6 is an enlarged inlet end view of the splash block component.
Figure 7:
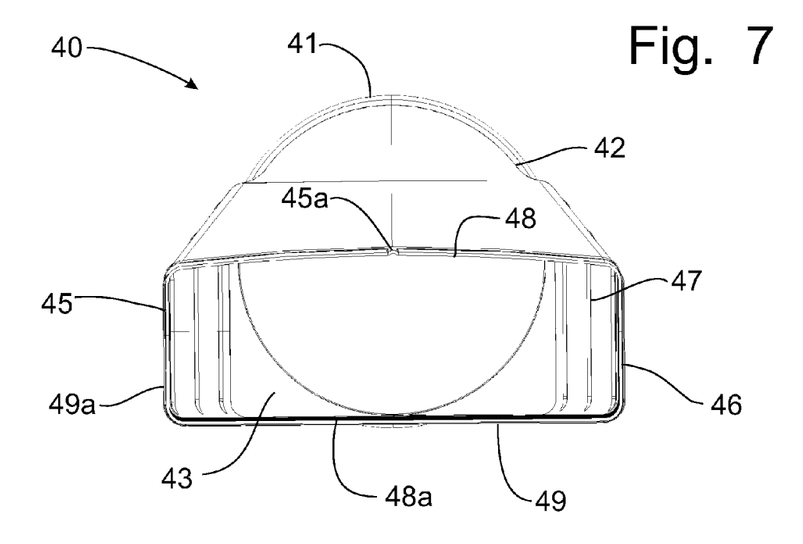
FIG. 7 is an enlarged outlet end view of the splash block component.

The orientation of the inlet end 41 of the splash block 40 relative to the outlet end 49 of the body portion 45 defines a generally linearly extending flow path along the bottom portion 48a, although the shape of the cross-sectional configuration of the splash block 40 along the flow path changes from circular at the inlet opening 41, through a transitional shaping to present a wider bottom surface 48a along the pentagon-shaped body portion 45. As a result, the water will flow smoothly from the inlet end 41 to the outlet end 49.

As with the conduit system described in co-pending U.S. patent application Ser. No. 12/952,078, the last component of the flex conduit system 10 is the extension member, best seen in FIGS. 13-16, the configuration of which is formed substantially identically to the body portion 45 of the splash block 40. The extension member 30 has the same pentagon cross-sectional shape as the body portion 35 to permit a tight mating therewith, preferably including the central bead 45 along the top surface thereof to form the upper apex of the pentagon shape. The proximal end 31 of the extension member 30 has a slightly enlarged cross-section to receive the remote outlet end 49 of the low profile body portion 45 of the splash block component 40. Conversely, the distal end 33 of the extension member is formed with a slightly smaller cross-sectional shape to be adapted to nest internally of the proximal end 31 of the next extension member 30 in the event more than one extension member 30 is required to attain the desired overall length of the flexible conduit system 10. A connecting rib 32 will provide an annular engagement structure for mating with the connecting rib 49a on the outlet end 49 of the splash block 40, while a sealing bead 34 at the opposing distal end 33 will facilitate sequential coupling of multiple extension members to form a low profile conduit 10 of substantial length.

The maximum length of the assembly 10 shown in FIG. 1 is when the connecting rib 32 on the extension member 30 is engaged with the connecting rib 49a on outlet end 49 of the body portion 45. If substantially the entire length of the extension member 30 is formed in a larger cross-section shape like the proximal end, the extension member 30 can slide along the length of the body portion 45 by forcing the connecting rib 32 past the connecting rib 49a and also past the connecting ribs 47 along the side walls 46 of the body portion. In this manner, a reduction in the overall length of the low profile conduit system 10 can be accomplished by telescoping of the first extension member 30 onto the body portion 45 of the splash block member 40 to provide a finite length adjustment equivalent to substantially the longitudinal length of the first extension member 30. Subsequent extension members 30 connecting the proximal end 31 onto the adjacent distal end 33 can provide a length conduit system 10 with the finite adjustment to the overall length being accomplished through manipulation of the first extension member 30 and the body portion 45 of the splash block component 40.

As is depicted in FIGS. 1 and 2, the flex conduit component 20, and the adapter 15 connected thereto, can be oriented in orthogonal configuration to provide an A/B option as a connecting elbow. The position shown in FIG. 1 is the most typical orientation, as this corresponds to most downspout constructions. Some downspouts (not shown) are oriented at ninety degrees to this typical orientation, and the flex conduit component can be turned ninety degrees about the connection of the outlet end 27 of the flex conduit component 20 to the inlet end 41 of the splash block component 40. The circular construction of the flexible corrugated central portion 25 does not change its perspective with respect to the surroundings.

Figure 10:
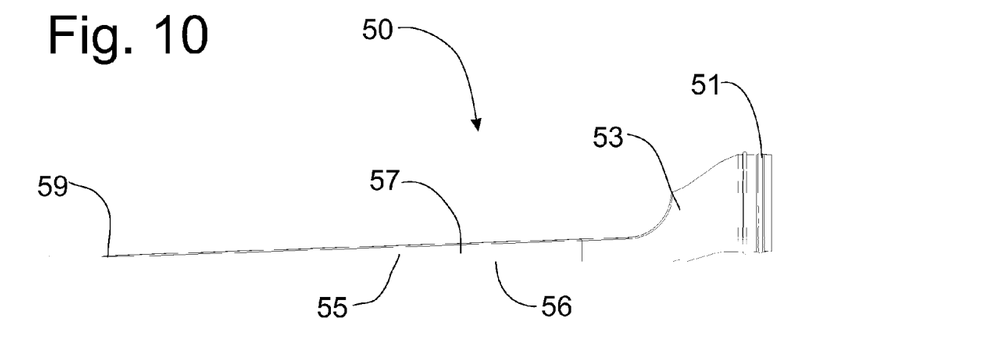
FIG. 10 is a side elevational view of an alternative open splash block component.
Figure 11:
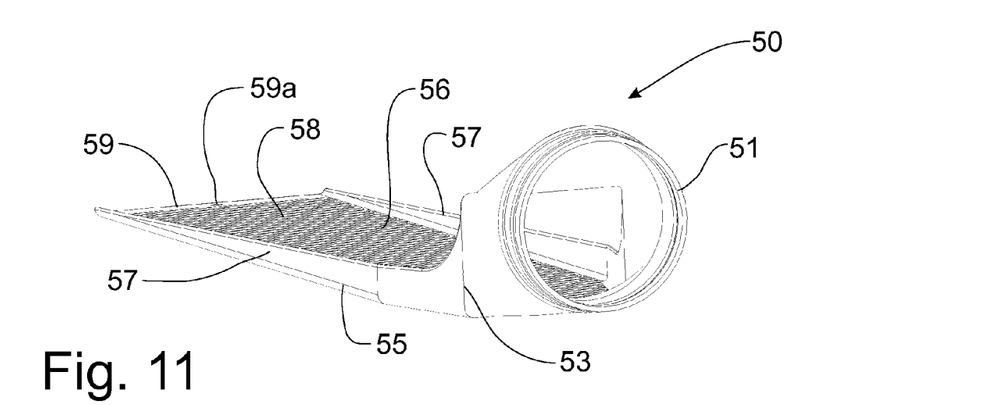
FIG. 11 is a rear perspective view of the alternative open splash block component shown in FIG. 10.
Figure 12:
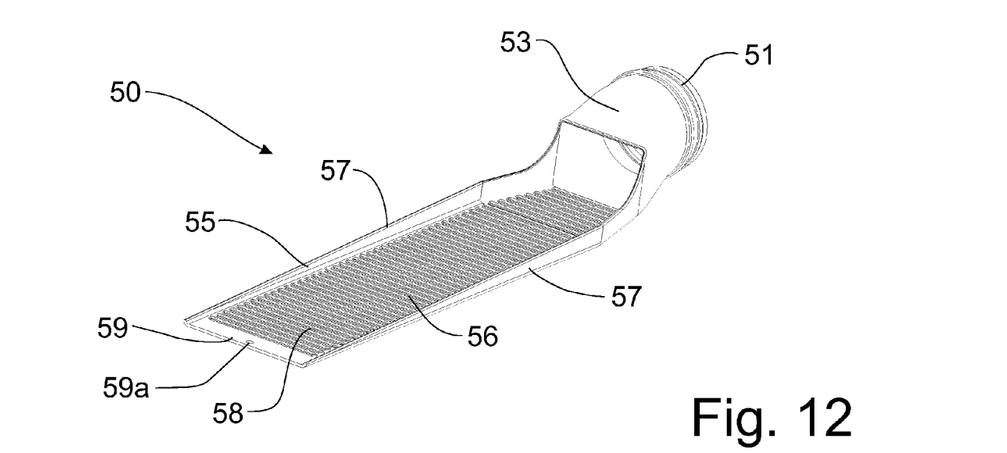
FIG. 12 is a front perspective view of the alternative open splash block component shown in FIG. 10.
Figure 13:
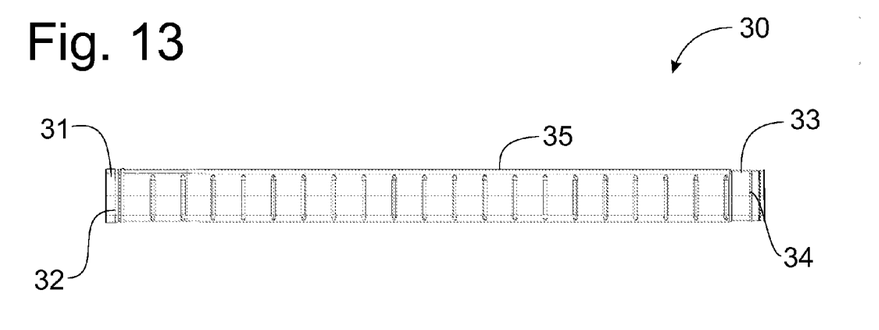
FIG. 13 is a side elevational view of an extension member for extending the length of the low profile portion of the splash block component.
Figure 14:
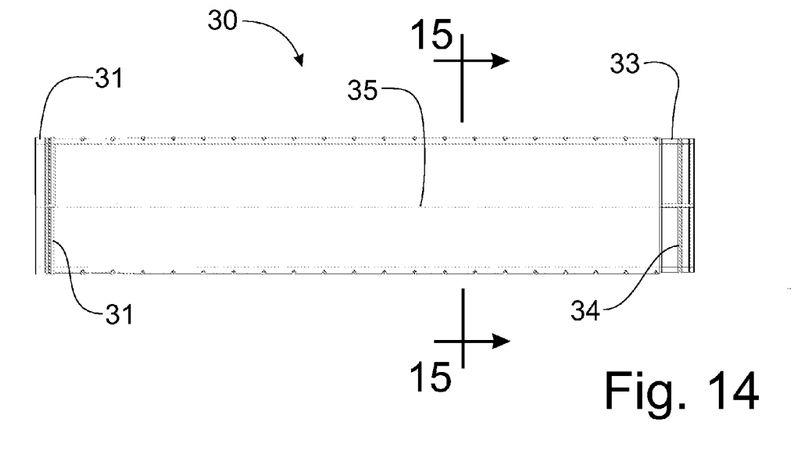
FIG. 14 is a top plan view of the extension member shown in FIG. 13.
Figure 15:
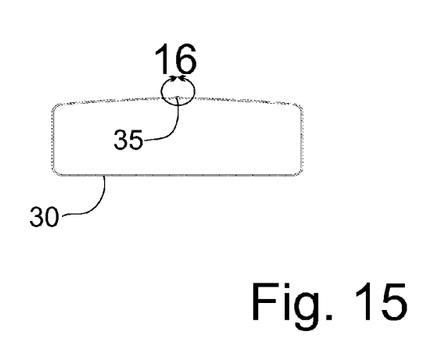
FIG. 15 is an enlarged cross-sectional view taken along lines 15-15 of FIG. 14 to depict the non-rectangular configuration of the extension member.
Figure 16:
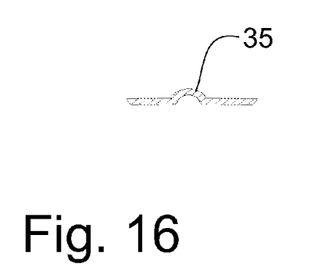
FIG. 16 is an enlarged detail view showing the shape of the central bead along the longitudinal length of the extension member, corresponding to the circle 16 in FIG. 15.

An alternative open splash block 50 configuration is shown in FIGS. 10-12 to provide an above-ground alternative to the closed body portion configuration of the splash block component 40. The alternative splash block 50 is formed with the circular inlet end 51 that opens into a transition portion 53 converting the circular shape of the inlet end 51 into a U-shaped open splash pad 55 that has a width greater than the diameter of the inlet end 51. The splash pad 55 is devoid of an upper surface and is defined by a bottom surface 56 and tapered upright side walls 57 that have a minimum height at the distal outlet end 59. The bottom surface is preferably formed with transversely oriented ribs 58 to dissipate energy of the rain water discharged into the splash block 50 from the connected downspout (not shown). The transition portion 53 is partially open along the top surface thereof to conform to the shape of the splash pad 55, but is closed adjacent the circular inlet end 51 to provide stability and strength to the inlet end 51.

The alternative splash block configuration 50 can be connected to a downspout (not shown) in the same manner as the splash block 40 by connecting the circular discharge end 27 of a flexible conduit component 20 to the inlet end 51 and also connecting the rectangular inlet end 21 to the downspout either directly or through an adapter 15 to provide flow communication between the downspout and the alternative splash block component 50. In this configuration, the alternative splash block 50 can be placed on top of landscaping to dissipate the discharge rainwater from the downspout over the discharge end 59 onto the landscaping. The discharge end 59 is preferably provided with an opening 59a through which a spike can be inserted to secure the discharge end 59 to the surface over which the splash pad 55 is positioned. The inlet end 51 is preferably elevated above the splash pad 55, such that the bottom of the circular inlet 51 is located above the plane of the bottom surface 56, so that a back flow of water from the splash pad 55 into the flexible conduit component 20 is restricted.

It will be understood that changes in the details, materials, steps and arrangements of parts which have been described and illustrated to explain the nature of the invention will occur to and may be made by those skilled in the art upon a reading of this disclosure within the principles and scope of the invention. For example, the preferred material used to construct the components of the instant invention is a hydrocarbon polymer; however, one of ordinary skill in the art will recognize that other materials, such as other ferrous or non-ferrous materials, natural or synthetic rubber, fiber reinforced resin or a hybrid combination of such materials, could also be utilized to provide a flexible conduit system as described herein. The foregoing description illustrates the preferred embodiment of the invention; however, concepts, as based upon the description, may be employed in other embodiments without departing from the scope of the invention.

What is claimed is:
1. An open splash block member for connection to a discharge end of a downspout, the open splash block member comprising:
  a circular inlet end;
  a distal outlet end; and
  a splash pad between the circular inlet end and the distal outlet end, the splash pad comprising a bottom surface and sidewalls that extend from the bottom surface and that are tapered such that a height of the sidewalls decreases from the circular inlet end toward the distal outlet end,
  wherein the bottom surface of the splash pad is exposed such that the splash pad has an open configuration and wherein the bottom surface comprises a plurality of ribs that each generally extend between the sidewalls, wherein a first end of each of the plurality of ribs is adjacent a first of the sidewalls and a second end of each of the plurality of ribs is adjacent a second of the sidewalls such that the plurality of ribs extend transverse to the sidewalls, and
  wherein a bottom of the circular inlet is elevated relative to the bottom surface of the splash pad.
2. The open splash block member of claim 1 further comprising a transition portion between the circular inlet and the splash pad that transitions a circular shape of the circular inlet end into a generally U-shape cross section of the splash pad.

3. The open splash block member of claim 1, wherein a cross section of at least a portion of the splash pad is generally U-shaped.

4. The open splash block member of claim 2, wherein a width of the transition portion is greater than a diameter of the circular inlet end.

5. The open splash block member of claim 1, wherein the bottom surface of the splash pad is not covered by a top surface.

6. The open splash block member of claim 1, wherein the sidewalls of the splash pad are generally parallel to one another.

7. The open splash block member of claim 2, wherein the transition portion comprises a top surface.

8. A downspout extension for connection to a discharge end of a downspout mounted on a building structure, the downspout extension comprising:
 a flexible conduit component comprising a conduit inlet end, a circular conduit outlet end and a flexible corrugated portion between the conduit inlet end and the circular conduit outlet end, wherein the conduit inlet end is connectable to the discharge end of the downspout; and
 an open splash block member comprising:
  a circular inlet end connectable to the circular outlet end of the flexible conduit component and defining a splash block circular inlet opening having a diameter dimension,
  an open splash pad comprising:
   a proximal end proximate the splash block circular inlet end,
   a distal outlet end opposite the proximal end,
   a bottom surface, and
   sidewalls that extend upwardly from the bottom surface and that decrease in height from the proximal end toward the distal outlet end, wherein at least a portion of the open splash pad has a generally U-shaped cross-section, and
  a transition portion integrally formed with the splash block circular inlet end that transitions a cross-sectional configuration of the splash block member from a circular configuration of the splash block circular inlet end to a generally U-shaped configuration of the proximal end of the splash pad,
 wherein the bottom surface of the open splash pad comprises a plurality of ribs that extend transverse to the sidewalls, and
 wherein a width of the transition portion is greater than the diameter dimension of the splash block circular inlet opening.

9. The downspout extension of claim 8, wherein the bottom surface is uncovered.

10. The downspout extension of claim 8, wherein a bottom of the splash block circular inlet end is elevated relative to the bottom surface of the splash pad.

11. The downspout extension of claim 8, wherein the transition portion comprises a top surface and wherein the sidewalls of the open splash pad are generally parallel to one another.

12. A low profile open splash block member for connection to a discharge end of a downspout mounted on a building structure, the low profile open splash block member comprising:
 a circular inlet end defining a circular inlet opening having an inlet diameter,
 a distal outlet end,
 an open splash pad comprising a bottom surface and sidewalls that extend upwardly from the bottom surface at least partially along a length of the open splash pad, wherein at least a portion of the open splash pad has a generally U-shaped cross-section and wherein the bottom surface of the open splash pad comprises a plurality of ribs that are each transverse to the sidewalls, and
 a transition portion between the circular inlet end and a proximal end of the open splash pad that transitions a cross-sectional configuration of the splash block member from a circular configuration to a generally U-shaped configuration, wherein the transition portion comprises a top surface and wherein a width of the transition portion is greater than the inlet diameter.

13. The open splash block member of claim 12, wherein a height of the sidewalls tapers toward the distal outlet end.

14. The open splash block member of claim 12, wherein the bottom surface is uncovered such that the bottom surface is exposed.

15. The open splash block member of claim 12, wherein a bottom of the circular inlet end is elevated relative to the bottom surface of the splash pad.

16. The open splash block member of claim 12, further comprising a flexible conduit component with a conduit inlet end connectable to the discharge end of the downspout, a circular conduit outlet end connectable to the circular inlet end of the low profile open splash block member and a flexible corrugated portion between the conduit inlet end and the circular conduit outlet end.

17. The open splash block member of claim 12, wherein the transition portion is integrally formed with the circular inlet end.

18. The open splash block member of claim 17, wherein the transition portion is integrally formed with the proximal end of the splash pad.

19. A downspout extension for connecting to a discharge end of a downspout, the downspout extension comprising:
 a circular inlet end defining a circular inlet end opening;
 a transition portion integrally formed with the circular inlet end to transition a cross section of the downspout extension from a circular configuration to a non-circular configuration, the transition portion comprising a top surface and a bottom surface and a pair of laterally spaced sidewalls connecting the top surface and the bottom surface; and
 a body portion integrally formed with the transition portion and terminating at an outlet end, the body portion comprising:
  a top surface and a bottom surface and a pair of laterally spaced sidewalls connecting the top surface and the bottom surface, wherein the top surface extends between a front edge and a rear edge; and
  a longitudinally extending central bead formed in the top surface of the body portion and defining an apex of the top surface such that a first portion of the top surface slopes downwardly from the apex to a first of the pair of laterally spaced sidewalls and a second portion of the top surface slopes downwardly from the apex to a second of the pair of laterally spaced sidewalls, wherein the longitudinally extending central bead extends from the front edge to the rear edge of the top surface,
 wherein each of the pair of laterally spaced sidewalls connecting the top surface and the bottom surface of the transition portion comprises a plurality of reinforcing ribs that each generally extend between the top surface and the bottom surface of the transition portion, wherein a width of the transition portion is greater than a diameter of the circular inlet opening, and wherein a portion of the top surface of the body portion corresponding to the transition portion is planar.

20. The downspout extension of claim 19, wherein a cross section of the body portion is generally non-rectangular.

21. The downspout extension of claim 20, wherein the cross section of the body portion has a generally pentagon shape.

* * * * *